United States Patent Office 3,026,360
Patented Mar. 20, 1962

3,026,360
PRODUCTION OF CHLOROPRENE
Stefan Kazimierz Lachowicz, North Cheam, England, assignor to The Distillers Company Limited, Edinburgh, Scotland, a British company
No Drawing. Filed Mar. 15, 1960, Ser. No. 15,055
Claims priority, application Great Britain Apr. 2, 1959
8 Claims. (Cl. 260—655)

The present invention relates to the production of chloroprene (2-chlorbutadiene) for use in polymerisation reactions.

The process of chlorinating butadiene to give a mixture of 3:4-dichlorbutene-1 and 1:4-dichlorbutene-2, isomerising the later to 3:4-dichlorbutene-1 and dehydrochlorinating the 3:4-dichlorbutene-1 with aqueous alkali to give chloroprene is known. The chloroprene so obtained may then be used in polymerisation and copolymerisation reactions, for which uses it is desirable that the chloroprene should be as pure as possible. It has been found that the chloroprene obtained in this way contains a small amount of 1-chlorbutadiene, the presence of which in the chloroprene imparts undesirable properties to polymers obtained from it. The 1-chlorbutadiene is formed in the dehydrochlorination reaction in a yield of about 2 to 3% based on the 3:4-dichlorbutene-1 consumed, and on distillation of the reaction mixture to recover the chloroprene, the 1-chlorbutadiene (boiling point 68° C.) distils with the chloroprene (boiling point 59.4° C.) owing to the proximity of their boiling points. The separation of the two components by a fractional distillation step in a column of many plates, in which the residence time is of necessity long, is possible, but is not desirable in an industrial plant owing to the substantial losses of chloroprene which occur by dimerisation and polymerisation.

It is an object of the present invention to provide an improved process for the production of chloroprene suitable for use in polymerisation reactions.

According to the present invention, the process for the production of chloroprene comprises dehydrochlorinating 3:4-dichlorbutene-1 with aqueous alkali in the presence of a relatively inert water-immiscible liquid organic compound boiling above the boiling point of 1-chlorbutadiene, and separating by distillation, at a temperature below the boiling point of the compound, an overhead fraction containing chloroprene substantially free from 1-chlorbutadiene.

The dehydrochlorination of the 3:4-dichlorbutene-1 with aqueous alkali may be carried out in any suitable manner, for instance by heating the dichlorbutene with an aqueous solution of an alkali metal hydroxide such as sodium or potassium hydroxide. If desired the dehydrochlorination can be carried out at reduced or increased pressures. In a preferred embodiment the 3:4-dichlorbutene-1 is heated with an aqueous alkali metal hydroxide solution, in the presence of a relatively inert water-immiscible liquid organic compound, at the boiling point of the reaction mixture and chloroprene substantially free from 1-chlorbutadiene is distilled off overhead, with a reflux ratio of at least 5:1.

The liquid organic compound may be any relatively inert water-immiscible liquid organic compound having a boiling point at atmospheric pressure of over 68° C. (the boiling point of 1-chlorbutadiene). The term water-immiscible liquid compound means a compound which will form a separate organic phase with the aqueous reaction mixture at the temperature at which the distillation is carried out. Suitable substances include inert aromatic hydrocarbons such as xylene, toluene, tetraline, or decaline, paraffin hydrocarbons, e.g. octane, and petroleum ether of a suitable boiling point, e.g. greater than 80° C., and also chlorinated hydrocarbons such as dichlorbutanes which react relatively slowly with the aqueous alkali solution.

The distillation of the reaction mixture to separate an overhead fraction containing chloroprene substantially free from 1-chlorbutadiene may be carried out in any suitable manner. The reflux ratio of the distillation is suitably at least 5:1, and is preferably about 10:1.

The amount of 1-chlorbutadiene present in the overhead chloroprene product obtained by fractional distillation can be determined by gas chromatography methods. Such methods are available to estimate 1-chlorbutadiene in concentration down to 0.01% or less. In carrying out the process of the present invention the fractional distillation is preferably so carried out that the chloroprene obtained contains less than 1% by weight of 1-chlorbutadiene.

The base product from the distillation contains the inert water-immiscible organic compound together with 1-chlorbutadiene and a small proportion of the chloroprene. This chloroprene may be partially separated from the 1-chlorbutadiene in a subsequent column and recycled to the distillation.

The process of the invention is further illustrated by the following examples.

Example 1

3:4-dichlorbutene-1 was continuously dehydrochlorinated in a reaction vessel fitted with agitating means, an overflow device and a distillation column equivalent to 20 theoretical plates. The starting material, consisting of 57.8 wt. percent of 3:4-dichlorbutene-1, 10.2% of dichlorbutanes and 32% of xylene was continuously introduced into the reaction vessel at a rate of about 270 parts by volume per hour, together with a feed of 10% aqueous sodium hydroxide at a rate of 680 parts by volume per hour. The reaction mixture was maintained at 85° C. and the vapours evolved were fractionated in the column at a reflux ratio of 10:1 to recover chloroprene as the distillate. The efficiency of production of chloroprene was 96.4 mole percent. Of the chloroprene formed in the reaction 75% was recovered in the overhead fraction, which contained about 0.5% of 1-chlorbutadiene. The remaining 25% of chloroprene passed out in the base product together with 83% of the total 1-chlorbutadiene formed in the reaction.

Example 2

3:4-dichlorbutene-1 was continuously dehydrochlorinated in two reaction vessels connected in series and fitted with a distillation column erected above the second reaction vessel. A starting material consisting of 85 wt. percent of 3,4-dichlorbutene-1 and 14.3 wt. percent of dichlorbutanes was continuously introduced into the first reaction vessel at a rate of 23.5 parts by volume per hour together with a feed of 10–12% aqueous sodium hydroxide at a rate of 70.5 parts of volume per hour. The reaction mixture was maintained at 85–87° C. and at a pressure of 7–8 p.s.i.g. and the vapours evolved from both reactors were fractionated in the column at a reflux ratio of 10:1 to recover chloroprene as an overhead fraction, containing 0.7% of 1-chlorbutadiene. The base product from the second reaction vessel was introduced into a steam stripping column the head product of which, consisting mainly of chloroprene with some 1-chlorbutadiene, was recycled to the dehydrochlorination column; the base product from the steam stripping column consisted of dichlorbutanes and small amounts of chloroprene and 1-chlorbutadiene.

I claim:
1. A process for the production of chloroprene which comprises, dehydrochlorinating 3:4-dichlorbutene-1 with aqueous alkali in the presence of a relatively inert water-immiscible liquid organic compound boiling above the boiling point of 1-chlorbutadiene, and separating by distillation at a temperature below the boiling point of said compound an overhead fraction containing chloroprene substantially free from 1-chlorbutadiene.

2. The process as claimed in claim 1 wherein the liquid organic compound is xylene.

3. The process as claimed in claim 1 wherein the liquid organic compound is dichlorbutane.

4. The process as claimed in claim 1 wherein the distillation is carried out at a reflux ratio of at least 5:1.

5. The process as claimed in claim 1 wherein the distillation is carried out at a reflux ratio of about 10:1.

6. The process as claimed in claim 1 wherein the alkali is an alkali metal hydroxide.

7. The process as claimed in claim 1 wherein the dehydrochlorination is carried out at the boiling point of the reaction mixture and chloroprene, substantially free from 1-chlorbutadiene, is distilled off as it is formed.

8. The process as claimed in claim 1 wherein the dehydrochlorination is carried out under super-atmospheric pressure.

References Cited in the file of this patent

UNITED STATES PATENTS 2,180,115     Lange et al. _____ Nov. 14, 1939